(12) United States Patent
Lee et al.

(10) Patent No.: US 10,652,610 B2
(45) Date of Patent: May 12, 2020

(54) CONTENT PROVIDING DEVICE AND POWER SOURCE CONTROLLING METHOD THEREOF

(71) Applicant: SAMSUNG ELECTRONICS CO., LTD., Suwon-si (KR)

(72) Inventors: Seung Bok Lee, Hwaseong-si (KR); Eung Sik Yoon, Suwon-si (KR); Jin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 15/688,278

(22) Filed: Aug. 28, 2017

(65) Prior Publication Data

US 2018/0063575 A1    Mar. 1, 2018

(30) Foreign Application Priority Data

Aug. 31, 2016   (KR) .................... 10-2016-0111874

(51) Int. Cl.
*H04N 21/436* (2011.01)
*H04N 21/4363* (2011.01)
*G06F 3/14* (2006.01)
*G09G 5/00* (2006.01)

(52) U.S. Cl.
CPC ......... *H04N 21/43615* (2013.01); *G06F 3/14* (2013.01); *G09G 5/006* (2013.01); *H04N 21/43637* (2013.01); *G09G 2330/021* (2013.01); *G09G 2370/16* (2013.01)

(58) Field of Classification Search
CPC ....... H04N 21/43615; H04N 21/43637; G09G 2370/16
See application file for complete search history.

(56) References Cited

U.S. PATENT DOCUMENTS

| 8,095,713 | B2 | 1/2012 | Minoo et al. |
| 9,448,606 | B2 | 9/2016 | Harel et al. |
| 9,787,741 | B2 | 10/2017 | Nair |
| 2008/0288707 | A1* | 11/2008 | Nicolet ............... G06F 13/4068 710/310 |
| 2009/0061678 | A1* | 3/2009 | Minoo .................. H01R 29/00 439/502 |
| 2010/0135429 | A1 | 6/2010 | Nakajima |

(Continued)

FOREIGN PATENT DOCUMENTS

| KR | 10-2010-0035728 A | 4/2010 |
| KR | 10-2013-0142320 A | 12/2013 |

OTHER PUBLICATIONS

International Search Report and Written Opinion dated Nov. 27, 2017, issued by the International Searching Authority in counterpart International Patent Application No. PCT/KR2017/008876 (PCT/ISA/210, PCT/ISA/220, and PCT/ISA/237).

(Continued)

*Primary Examiner* — Saad A. Waqas
(74) *Attorney, Agent, or Firm* — Sughrue Mion, PLLC

(57) ABSTRACT

A content providing device includes a first wired interface that communicates with a first external electronic device through a wired cable or a wireless dongle, and a processor that determines whether the wired cable or the wireless dongle is connected to the first wired interface, and selects a power source based on whether the wired cable or the wireless dongle is connected to the first wired interface.

12 Claims, 8 Drawing Sheets

(56) References Cited

U.S. PATENT DOCUMENTS

| | | |
|---|---|---|
| 2012/0003863 A1 | 1/2012 | Sung et al. |
| 2013/0174208 A1 | 7/2013 | Lee et al. |
| 2015/0006673 A1* | 1/2015 | Nair ............... H04N 5/765 |
| | | 709/217 |
| 2015/0077408 A1 | 3/2015 | Wang et al. |
| 2016/0062935 A1 | 3/2016 | Talmola |
| 2016/0065878 A1 | 3/2016 | Nagumo et al. |
| 2016/0085280 A1* | 3/2016 | Harel ............... G06F 1/263 |
| | | 710/14 |
| 2017/0148416 A1 | 5/2017 | Lee et al. |
| 2017/0338840 A1* | 11/2017 | Mao ............... H02M 3/156 |

OTHER PUBLICATIONS

Communication dated Aug. 1, 2019 issued by the European Patent Office in counterpart European Patent Application No. 17846881.5.

* cited by examiner

CONTENT PROVIDING DEVICE AND POWER SOURCE CONTROLLING METHOD THEREOF

CROSS-REFERENCE TO RELATED APPLICATION(S)

This application claims priority from Korean patent application 10-2016-0111874, filed on Aug. 31, 2016 in the Korean Intellectual Property Office, the entire disclosure of which is incorporated herein by reference in its entirety.

BACKGROUND

1. Field

Apparatuses and methods consistent with example embodiments relate to a content providing device for providing content to an external electronic device by using power received from an external source, and a power source controlling method thereof.

2. Description of the Related Art

Due to advancements in digital technology, various electronic products are being developed. Along with multi-functionality of electronic products, there are many products, such as smartphones, which are provided with diverse services through a single device.

Additionally, the progress of communication technology increases services to be provided between electronic devices. For example, an electronic device, such as a television (TV), may be connected with a content providing device, such as a smart phone, set-top box, or game console, to provide users with a variety of content received from the content providing device.

In a case in which a wired cable and a wireless dongle are all connectable with a single wired interface, a content providing device or an electronic device may be conditioned in an insensible state about whether a wired cable is connected to a current wired interface or whether a wireless dongle is connected to a current wired interface.

SUMMARY

Example embodiments may address at least the above-mentioned problems and/or disadvantages and to provide at least the advantages described below. Example embodiments provide a content providing device for determining whether a wired cable or a wireless dongle is connected to a wired interface, and selecting a power source based on whether the wired cable or the wireless dongle is connected to the wired interface, and a power source controlling method thereof.

According to an aspect of an example embodiment, there is provided a content providing device including: a first wired interface configured to communicate with a first external electronic device through a wired cable or a wireless dongle; and a processor configured to: determine whether the wired cable or the wireless dongle is connected to the first wired interface; and select a power source based on whether the wired cable or the wireless dongle is connected to the first wired interface.

The first wired interface may include a connector connected to the wired cable or the wireless dongle.

The connector may include a pull-down resistor, and wherein the processor may be further configured to: in response to determining that the wired cable or the wireless dongle is connected to the connector, determine a voltage level applied to the pull-down resistor and, determine, based on the voltage level applied to the pull-down resistor, whether the wired cable or the wireless dongle is connected to the first wired interface.

The content providing device may further include a power interface configured to receive power from an external power source through a power cable, wherein the processor may be further configured to: in response to determining that the wired cable is connected to the first wired interface, receive power from the first external electronic device through the wired cable; and in response to determining that the wireless dongle is connected to the first wired interface, receive the power from the external power source through the power cable.

The processor may be further configured to, in response to determining that the wired cable is connected to the first wired interface, inactivate the power interface, and in response to determining that the wireless dongle is connected to the first wired interface, activate the power interface.

The processor may be further configured to determine whether the wired cable is a wired cable that is capable of supplying power or a wired cable that is incapable of supplying power based on the voltage level applied to the pull-down resistor.

The content providing device may further include a power interface configured to receive power from an external power source through a power cable, wherein the processor may be further configured to: in response to determining that the wired cable that is capable of supplying power is connected to the first wired interface, receive power from the first external electronic device through the wired cable; and in response to determining that the wireless dongle or the wired cable that is incapable of supplying power is connected to the first wired interface, receive the power from the external power source through the power cable.

The first wired interface may be a Serializer/Deserializer (SerDes) interface.

The content providing device may further include a second wired interface configured to communicate with a second external electronic device, wherein the second wired interface may include at least one from among a High Definition Multimedia Interface (HDMI), a Digital Video Interface (DVI), a Universal Serial Bus (USB) interface, and a Radio Frequency (RF) interface.

According to an aspect of another example embodiment, there is provided a power source controlling method of a content providing device, the method including: determining whether a wired cable or a wireless dongle is connected to a wired interface that is configured to communicate with an external electronic device through the wired cable or the wireless dongle; and selecting a power source based on whether the wired cable or the wireless dongle is connected to the wired interface.

The wired interface may include a connector connected to the wired cable or the wireless dongle.

The connector may include a pull-down resistor, wherein the determining whether the wired cable or the wireless dongle is connected to the wired interface may include: in response to determining that the wired cable or the wireless dongle is connected to the connector, determining a voltage level applied to the pull-down resistor; and determining, based on the voltage level applied to the pull-down resistor, whether the wired cable or the wireless dongle is connected to the connector.

The selecting of the power source may include: in response to determining that the wired cable is connected to the wired interface, receiving power from the external electronic device through the wired cable; and in response to determining that the wireless dongle is connected to the wired interface, receiving power from an external power source through a power cable connected to a power interface.

The receiving of the power from the external electronic device may include inactivating the power interface, and wherein the receiving of the power from the external power source may include activating the power interface.

The method may further include determining whether the wired cable is a wired cable that is capable of supplying power or a wired cable that is incapable of supplying power based on the voltage level applied to the pull-down resistor.

The selecting of the power source may include: in response to determining that the wired cable that is capable of supplying power is connected to the wired interface, receiving power from the external electronic device through the wired cable; and in response to determining that the wireless dongle or the wired cable that is incapable of supplying power is connected to the wired interface, receiving power from an external power source through a power cable connected with a power interface.

The wired interface may be a Serializer/Deserializer (SerDes) interface.

According to an aspect of another example embodiment, there is provided a non-transitory computer-readable recording medium having embodied thereon a program, which when executed by a processor causes the processor to execute a method, the method including: determining whether a wired cable or a wireless dongle is connected to a wired interface that is configured to communicate with an external electronic device through the wired cable or the wireless dongle; and selecting a power source based on whether the wired cable or the wireless dongle is connected to the wired interface.

The wired interface may include a connector connected to the wired cable or the wireless dongle.

The connector may include a pull-down resistor, wherein the determining of whether the wired cable or the wireless dongle is connected to the wired interface may include: in response to determining that the wired cable or the wireless dongle is connected to the connector, determining a voltage level applied to the pull-down resistor; and determining, based on the voltage level applied to the pull-down resistor, whether the wired cable or the wireless dongle is connected to the connector.

Other aspects, advantages, and salient features of the disclosure will become apparent to those skilled in the art from the following detailed description, taken in conjunction with the drawings.

BRIEF DESCRIPTION OF THE DRAWINGS

The above and/or other aspects will be more apparent from the following description of example embodiments taken in conjunction with the accompanying drawings, in which.

DETAILED DESCRIPTION

Figure 1:
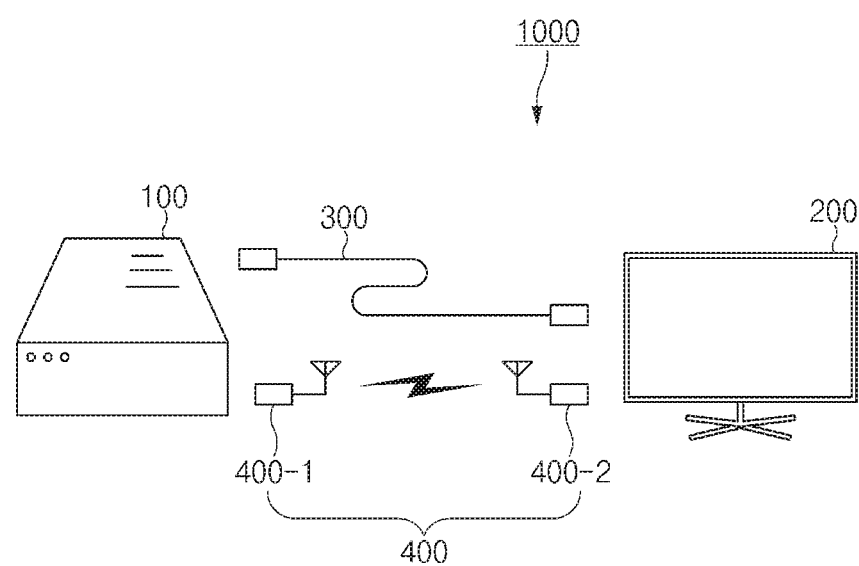
FIG. 1 is a block diagram illustrating a configuration of a content providing system according to an example embodiment.

Below, example embodiments are described with reference to accompanying drawings. Those of ordinary skill in the art will recognize that modification, equivalents, and/or alternatives of the various example embodiments described herein can be made without departing from the scope and spirit of the present disclosure. With regard to description of drawings, similar elements may be marked by similar reference numerals.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in this disclosure may be used to refer to various elements regardless of the order and/or the priority and to distinguish the relevant elements from other elements, but do not limit the elements. For example, "a first user device" and "a second user device" indicate different user devices regardless of the order or priority. For example, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used in this disclosure may be used as, for example, the expression "suitable for", "having the capacity to", "designed to", "adapted to", "made to", or "capable of". The term "configured to" does not necessarily mean "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in this disclosure are used to describe example embodiments and are not intended to limit the scope of another example embodiment. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as being customary in the relevant related art and not in an idealized or overly formal unless expressly so defined in various example embodiments. In some cases, even if terms are terms are defined in this disclosure, they may not be interpreted to exclude example embodiments.

FIG. 1 is a block diagram illustrating a configuration of a content providing system according to an example embodiment.

Referring to FIG. 1, a content providing system 1000 may include a content providing device 100 and an electronic device 200.

According to an example embodiment, the content providing device 100 may transmit content, which is received from an external source device or stored in an internal (or external) recording medium, to the electronic device 200. For example, the content providing device 100 may receive broadcasting content from a broadcasting station through a broadcasting network or receive web content from a web server through an internet network, and then may transmit the received content to the electronic device 200. As another example, the content providing device 100 may receive content from a peripheral device connected to a wired or wireless interface, and then may transmit the received content to the electronic device 200. As still another example, the content providing device 100 may play content stored in the recording medium, and then may transmit the played content to the electronic device 200. A recording medium may include, for example, a Compact Disk (CD), a Digital Versatile Disc (DVD), a hard disc, a Blu-ray disk, a memory card, or a USB memory. For example, content may be content including an image and/or an audio, such as movie, drama, news, game, photograph, or music.

According to an example embodiment, the content providing device 100 may be a source device, such as a set-top box, a game console (e.g., Xbox™, PlayStation™, etc.), a smart phone, a tablet PC, or the like, capable of receiving or storing content and transmitting the content to the electronic device 200. According to another example embodiment, the content providing device 100 may be an input/output unit capable of receiving content from the aforementioned source device and transmitting the content to the electronic device 200.

According to an example embodiment, the electronic device 200 may receive content from the content providing device 100. According to an example embodiment, the wired cable 300 may be connected with the content providing device 100 and the electronic device 200 in a wired manner to transmit content, which is received from the content providing device 100, to the electronic device 200.

According to an example embodiment, the content providing device 100 and the electronic device 200 may be connected each other through a wired cable 300. For example, the wired cable 300 may be connected with the content providing device 100 and the electronic device 200 in a wired manner and may transmit content, which is received from the content providing device 100, to the electronic device 200. According to an example embodiment, the content providing device 100 and the electronic device 200 may be connected each other through a wireless dongle 400. For example, a first wireless dongle 400-1 may be connected to the content providing device 100 in a wired manner and a second wireless dongle 400-2 may be connected to the electronic device 200 through a wire. The first wireless dongle 400-1 and the second wireless dongle 400-2 may perform wireless communication. The first wireless dongle 400-1 may transmit content, which is received from the content providing device 100, to the second wireless dongle 400-2 through wireless communication and the second wireless dongle 400-2 may transmit the content, which is received from the first wireless dongle 400-1, to the electronic device 200. According to an example embodiment, in the case that the electronic device 200 includes a wireless interface communicable with the first wireless dongle 400-1, the second wireless dongle 400-2 may be excluded.

According to an example embodiment, the wired cable 300 or the first wireless dongle 400-1 may be connected to the content providing device 100 through the same connector included in the content providing device 100. In the case that the wired cable 300 or the first wireless dongle 400-1 is connectable to the content providing device 100 through the same connector, the content providing device 100 may be conditioned in an insensible state about whether the wired cable 300 is connected to the connector or the first wireless dongle 400-1 is connected to the connector. The content providing device 100 according to various example embodiments may determine whether the wired cable 300 or the first wireless dongle 400-1 is connected to the connector, and select a power source based on whether the wired cable 300 or the first wireless dongle 400-1 is connected.

Figure 2:
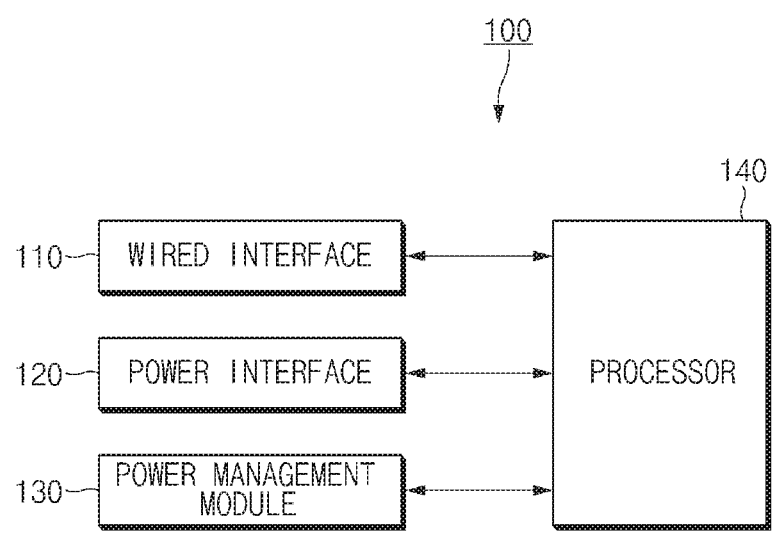
FIG. 2 is a block diagram illustrating a configuration of a content providing device according to an example embodiment.

FIG. 2 is a block diagram illustrating a configuration of a content providing device 100 according to various example embodiments.

Referring to FIG. 2, the content providing device 100 according to an example embodiment may include a wired interface (or a wired communication circuit) 110, a power interface 120, a power management module 130, and a processor 140.

According to an example embodiment, the wired interface 110 may communicate with an electronic device 200. For example, the wired interface 110 may communicate with the electronic device 200 through the wired cable 300 or the first wireless dongle 400-1 connected with the wired interface 110. According to an example embodiment, the wired interface 110 may be a Serializer/Deserializer (SerDes) interface.

According to an example embodiment, the wired interface 110 may include one connector connected with the wired cable 300 or the first wireless dongle 400-1. According to an example embodiment, if the wired cable 300 is connected to the connector, the wired interface 110 may receive power from the electronic device 200 through the wired cable 300.

According to an example embodiment, the power interface 120 may be electrically connected to an external power source to receive power from the external power source.

According to an example embodiment, the power interface 120 may be connected with an external power source (e.g., wall power source) through a power cable. For example, a connector included in the power cable may be connected to a connector included in the power interface 120 and a plug included in the power cable may be connected to a socket. According to an example embodiment, the power cable may be formed separable from the content providing device 100 or integrated in the content providing device 100.

According to an example embodiment, the power management module 130 may manage power of the content providing device 100. For example, the power management module 130 may supply power, which is received from a power source, to each element of the content providing device 100. According to an example embodiment, the power management module 130 may receive power from a plurality of power sources. For example, the power management module 130 may receive power from the electronic device 200 through the wired interface 110. As another example, the power management module 130 may receive power from an external power source through the power interface 120. According to an example embodiment, the power management module 130 may include Power Management Integrated Circuit (PMIC).

According to an example embodiment, the processor 140 may control overall operations of the content providing device 100. For example, the processor 140 may select a power source, according to various example embodiments, by respectively controlling the wired interface 110, the power interface 120, and the power management module 130.

According to an example embodiment, the content providing device 100 may include at least one processor 140. For example, the content providing device 100 may include a plurality of processors capable of performing at least one function. According to an example embodiment, the processor 140 may be implemented even in a System-on-Chip (SoC) including a Central Processing Unit (CPU), a Graphic Processing Unit (GPU), a memory, and the like.

According to an example embodiment, if the wired cable 300 or the first wireless dongle 400-1 is connected to the wired interface 110, the processor 140 may determine whether the wired cable 300 or the first wireless dongle 400-1 is connected to the wired interface 110. According to an example embodiment, the processor 140 may select a power source based on whether the wired cable 300 or the first wireless dongle 400-1 is connected to the wired interface 110. Hereafter, states that the wired cable 300 is connected to the wired interface 110 and the first wireless dongle 400-1 is connected to the wired interface 110 will be described with reference to FIGS. 3 and 4.

Figure 3:
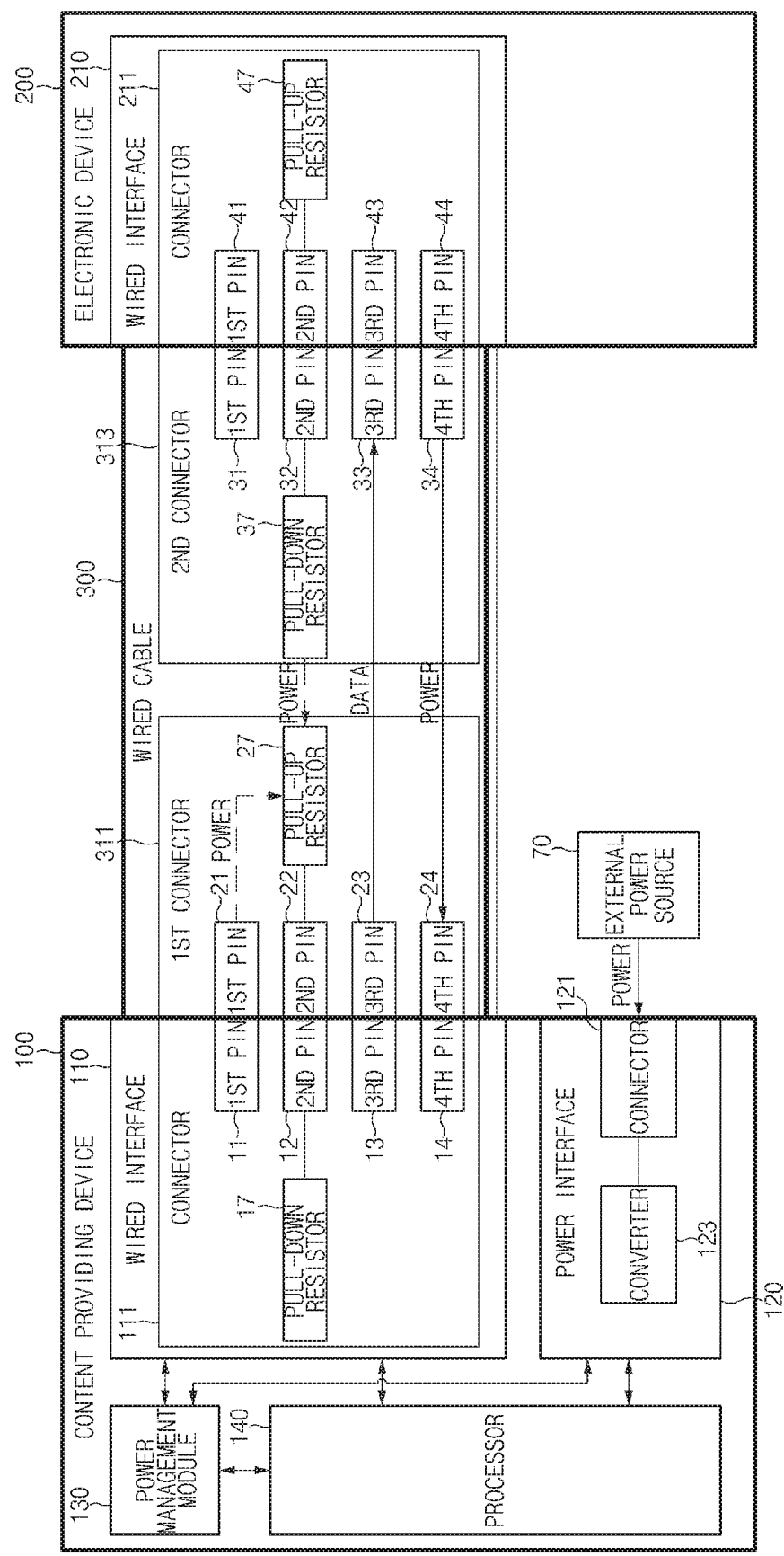
FIG. 3 is a block diagram illustrating a connecting relation between a content providing device, a wired cable, and an electronic device according to an example embodiment.

FIG. 3 is a block diagram illustrating a connecting relation between a content providing device, a wired cable, and an electronic device according to various example embodiments.

Referring to FIG. 3, the content providing device 100, according to an example embodiment, may include the wired interface 110, the power interface 120, the power management module 130, and the processor 140. According to an example embodiment, the wired interface 110 may include a connector 111. According to an example embodiment, the connector 111 may include a plurality of pins 11, 12, 13, and 14. According to an example embodiment, the connector 111 may include a pull-down resistor 17 electrically connected with the second pin 12. According to an example embodiment, the wired cable 300 may include a first connector 311. According to an example embodiment, the first connector 311 may include a plurality of pins 21, 22, 23, and 23, and a pull-up resistor 27 electrically connected with the second pin 22.

According to an example embodiment, the connector 111 included in the wired interface 110 of the content providing device 100 may be connected with the first connector 311 included in the wired cable 300. According to an example embodiment, if the first connector 311 of the wired cable 300 is connected to the connector 111 included in the content providing device 100, the plurality of pins 11, 12, 13, and 14 included in the connector 111 of the content providing device 100 may form a plurality of paths in contact with the plurality of pins 21, 22, 23, and 24 included in the first connector 311 of the wired cable 300. For example, the first pin 11 included in the connector 111 of the content providing device 100 may form a first path in contact with the first pin 21 included in the first connector 311 of the wired cable 300. The second pin 12 included in the connector 111 of the content providing device 100 may form a second path in contact with the second pin 22 included in the first connector 311 of the wired cable 300. The third pin 13 included in the connector 111 of the content providing device 100 may form a third path in contact with the third pin 23 included in the first connector 311 of the wired cable 300. The fourth pin 14 included in the connector 111 of the content providing device 100 may form a fourth path in contact with the fourth pin 24 included in the first connector 311 of the wired cable 300.

According to an example embodiment, the electronic device 200 may include a wired interface 210. According to an example embodiment, the wired interface 210 may include a connector 211. According to an example embodiment, the connector 211 may include a plurality of pins 41, 42, 43, and 44. According to an example embodiment, the connector 211 may include a pull-up resistor 47 electrically connected with the second pin 42. According to an example embodiment, the wired cable 300 may include a second connector 313. According to an example embodiment, the second connector 313 may include a plurality of pins 31, 32, 33, and 34, and a pull-down resistor 37 electrically connected with the second pin 32.

According to an example embodiment, the connector 211 included in the electronic device 200 may be connected with the second connector 313 included in the wired cable 300. According to an example embodiment, if the second connector 313 of the wired cable 300 is connected to the connector 211 included in the electronic device 200, the plurality of pins 41, 42, 43, and 44 included in the connector 211 of the electronic device 200 may form a plurality of paths in contact with the plurality of pins 31, 32, 33, and 34 included in the second connector 313 of the wired cable 300. For example, the first pin 41 included in the connector 211 of the electronic device 200 may form a fifth path in contact with the first pin 31 included in the second connector 313 of the wired cable 300. The second pin 42 included in the connector 211 of the electronic device 200 may form a sixth path in contact with the second pin 32 included in the second connector 313 of the wired cable 300. The third pin 43 included in the connector 211 of the electronic device 200 may form a seventh path in contact with the third pin 33 included in the second connector 313 of the wired cable 300. The fourth pin 44 included in the connector 211 of the electronic device 200 may form an eighth path in contact with the fourth pin 34 included in the second connector 313 of the wired cable 300.

According to an example embodiment, the pull-up resistor 27 included in the first connector 311 of the wired cable 300 may receive power from the content providing device 100 or the electronic device 200. For example, the power management module 130 of the content providing device 100 may supply power to the pull-up resistor 27 through the first path. As another example, the pull-up resistor 27 may be connected with the pull-down resistor 37 included in the second connector 313 and may receive power from the electronic device 200 through the sixth path.

According to an example embodiment, the pull-down resistor 17 included in the connector 111 of the content providing device 100 may be electrically connected through the second path with the pull-up resistor 27 included in the first connector 311 of the wired cable 300. If the pull-down resistor 17 and the pull-up resistor 27 are electrically connected each other, a voltage level applied to the pull-down resistor 17 and the pull-up resistor 27 may be changed. According to an example embodiment, a voltage level applied to the pull-down resistor 17 may be determined by resistance values of the pull-down resistor 17 and the pull-up resistor 27.

According to an example embodiment, the wired interface 110 may receive power from the electronic device 200 through the fourth and eighth paths. According to an example embodiment, the wired interface 110 may supply power, which is received from the electronic device 200, to the power management module 130.

According to an example embodiment, the power interface 120 may include a connector 121 and a converter 123. According to an example embodiment, the connector 121 included in the power interface 120 may be connected with a connector of a power cable to receive power POWER from an external power source 70. According to an example embodiment, the converter 123 may change a voltage of power received from the connector 121. For example, the converter 123 may change a voltage from 19 volts to 13 volts. According to an example embodiment, the power interface 120 may supply power, which is received from an external power source, to the power management module 130. According to an example embodiment, the processor 140 may transmit content DATA to the wired cable 300 through the third and seventh paths.

According to an example embodiment, the pull-up resistor 47 included in the connector 211 of the electronic device 200 may be electrically connected with the pull-down resistor 37 included in the second connector 313 of the wired cable 300 through the sixth path. If the pull-down resistor 37 and the pull-up resistor 47 are electrically connected each other, a voltage level applied to the pull-down resistor 37 and the pull-up resistor 47 may be changed. According to an example embodiment, a voltage level applied to the pull-up resistor 47 may be determined by resistance values of the pull-down resistor 37 and the pull-up resistor 47.

Figure 4:
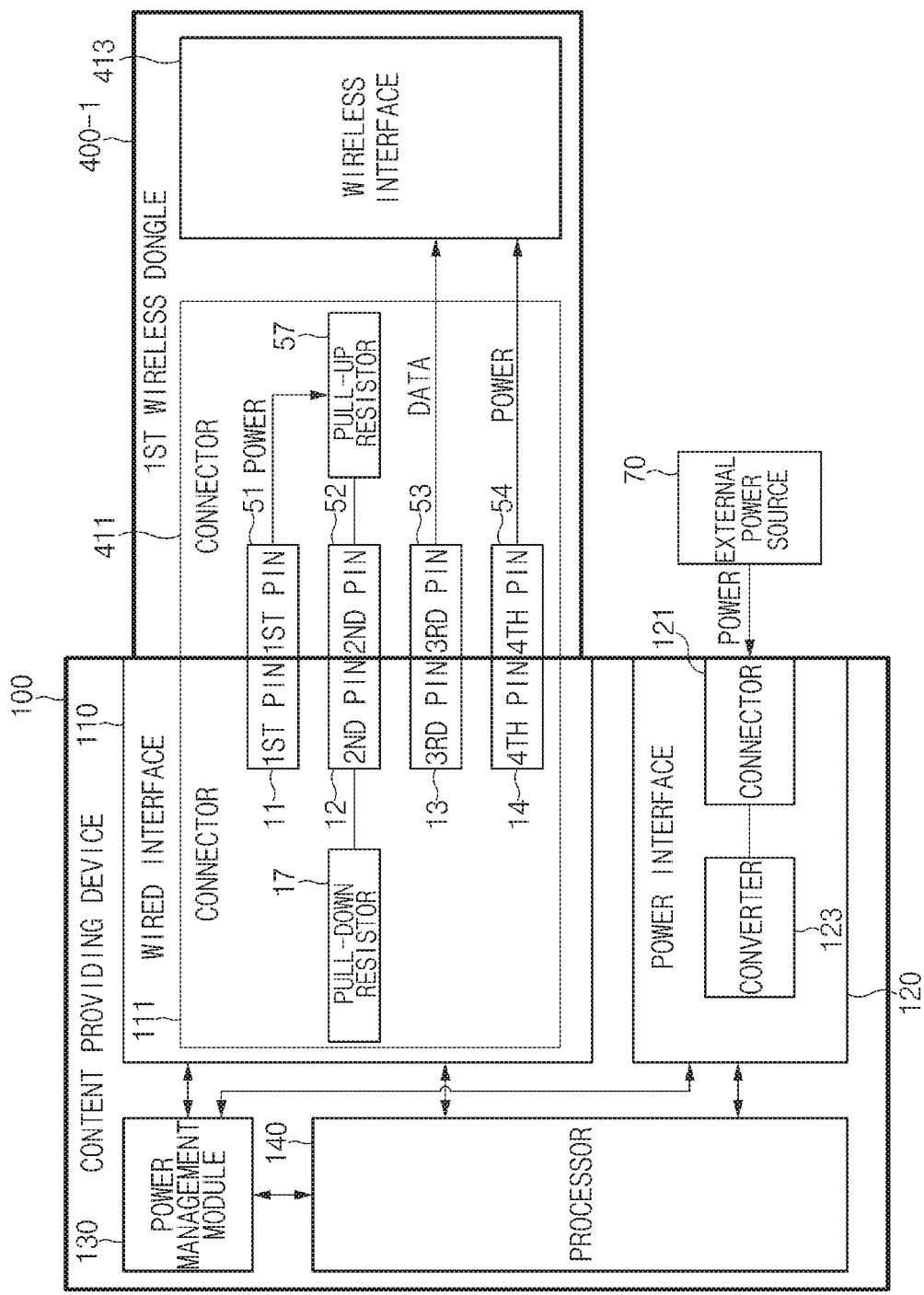
FIG. 4 is a block diagram illustrating a connecting relation between a content providing device and a first wireless dongle according to an example embodiment.

FIG. 4 is a block diagram illustrating a connecting relation between a content providing device and a first wireless dongle according to various example embodiments.

Referring to FIG. 4, the content providing device 100 according to an example embodiment may include the wired interface 110, the power interface 120, the power management module 130, and the processor 140. According to an example embodiment, the wired interface 110 may include the connector 111. According to an example embodiment, the connector may include the plurality of pins 11, 12, 13, and 14. According to an example embodiment, the connector 111 may include the pull-down resistor 17 electrically connected with the second pin 12. According to an example embodiment, the first wireless dongle 400-1 may include a connector 411 and a wireless interface 413. According to an example embodiment, the connector 411 may include a plurality of pins 51, 52, 53, and 54, and a pull-up resistor 57 electrically connected with the second pin 52.

According to an example embodiment, the connector 111 included in the wired interface 110 of the content providing device 100 may be connected with the connector 411 included in the first wireless dongle 400-1. According to an example embodiment, if the connector 411 of the first wireless dongle 400-1 is connected to the connector 111 included in the content providing device 100, the plurality of pins 11, 12, 13, and 14 included in the connector 111 of the content providing device 100 may form a plurality of paths in contact with the plurality of pins 51, 52, 53, and 54 included in the connector 411 of the first wireless dongle 400-1. For example, the first pin 11 included in the connector 111 of the content providing device 100 may form a first path in contact with the first pin 51 included in the connector 411 of the first wireless dongle 400-1. The second pin 12 included in the connector 111 of the content providing device 100 may form a second path in contact with the second pin 52 included in the connector 411 of the first wireless dongle 400-1. The third pin 13 included in the connector 111 of the content providing device 100 may form a third path in contact with the third pin 53 included in the connector 411 of the first wireless dongle 400-1. The fourth pin 14 included in the connector 111 of the content providing device 100 may form a fourth path in contact with the fourth pin 54 included in the connector 411 of the first wireless dongle 400-1.

According to an example embodiment, the pull-up resistor 57 included in the connector 411 of the first wireless dongle 400-1 may receive power from the content providing device 100. For example, the power management module 130 of the content providing device 100 may supply power to the pull-up resistor 57 through the first path.

According to an example embodiment, the pull-down resistor 17 included in the connector 111 of the content providing device 100 may be electrically connected with the pull-up resistor 57 included in the connector 411 of the first wireless dongle 400-1 through the second path. If the pull-down resistor 17 and the pull-up resistor 57 are electrically connected each other, a voltage level applied to the pull-down resistor 17 and the pull-up resistor 57 may be changed. According to an example embodiment, a voltage level applied to the pull-down resistor 17 may be determined by resistance values of the pull-down resistor 17 and the pull-up resistor 57.

According to an example embodiment, the power interface 120 may include the connector 121 and the converter 123. According to an example embodiment, the connector 121 included in the power interface 120 may be connected with a connector of a power cable to receive power POWER from the external power source 70. According to an example embodiment, the converter 123 may change a voltage of power received from the connector 121. For example, the converter 123 may change a voltage from 19 volts to 13 volts. According to an example embodiment, the power interface 120 may supply power, which is received from an external power source, to the power management module 130.

According to an example embodiment, the processor 140 may transmit content DATA to the wireless interface 413 of the first wireless dongle 400-1 through the third path. According to an example embodiment, the wireless interface 413 may include at least one of Wireless HD (WiHD) module, Wireless Fidelity (Wi-Fi) module, Wireless gigabit (Wigig) module, and Bluetooth module. The wireless interface 413 may transmit content, which is received from the content providing device 100, to the electronic device 200 through the aforementioned module.

Figure 5:
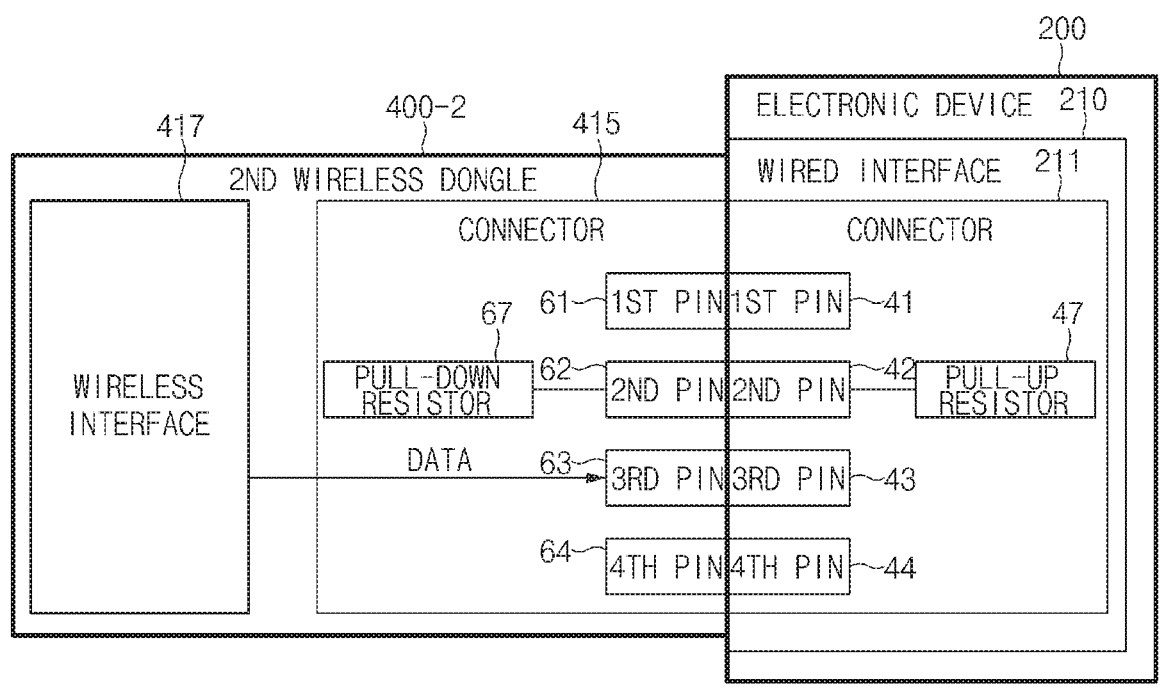
FIG. 5 is a block diagram illustrating a connecting relation between an electronic device and a second wireless dongle according to an example embodiment.

FIG. 5 is a block diagram illustrating a connecting relation between electronic device and a second wireless dongle according to various example embodiments.

Referring to FIG. 5, the electronic device 200 according to an example embodiment may include the wired interface 210. According to an example embodiment, the wired interface 210 may include the connector 211. According to an example embodiment, the connector 211 may include a plurality of pins 41, 42, 43, and 44. According to an example embodiment, the connector 211 may include the pull-up resistor 47 electrically connected with the second pin 42. According to an example embodiment, the second wireless dongle 400-2 may include a connector 415 and a wireless interface 417. According to an example embodiment, the connector 415 may include a plurality of pins 61, 62, 63, and 64, and a pull-down resistor 67 electrically connected with the second pin 62.

According to an example embodiment, the connector 211 included in the electronic device 200 may be connected with the connector 415 included in the second wireless dongle 400-2. According to an example embodiment, if the connector 415 included in the second wireless dongle 400-2 is connected to the connector 211 included in the electronic device 200, the plurality of pins 41, 42, 43, and 44 included in the connector 211 of the electronic device 200 may form a plurality of paths in contact with the plurality of pins 61, 62, 63, and 64 included in the connector 415 of the second wireless dongle 400-2. For example, the first pin 41 included in the connector 211 of the electronic device 200 may form a fifth path in contact with the first pin 61 included in the connector 415 of the second wireless dongle 400-2. The second pin 42 included in the connector 211 of the electronic device 200 may form a sixth path in contact with the second pin 62 included in the connector 415 of the second wireless dongle 400-2. The third pin 43 included in the connector 211 of the electronic device 200 may form a seventh path in contact with the third pin 63 included in the connector 415 of the second wireless dongle 400-2. The fourth pin 44 included in the connector 211 of the electronic device 200 may form an eighth path in contact with the fourth pin 64 included in the connector 415 of the second wireless dongle 400-2.

According to an example embodiment, the pull-up resistor 47 included in the connector 211 of the electronic device 200 may be electrically connected with the pull-down resistor 67 included in the connector 415 of the second wireless dongle 400-2 through the sixth path. If the pull-down resistor 67 and the pull-up resistor 47 are electrically connected each other, a voltage level applied to the pull-down resistor 67 and the pull-up resistor 47 may be changed. According to an example embodiment, a voltage level applied to the pull-up resistor 47 may be determined by resistance values of the pull-down resistor 67 and the pull-up resistor 47.

According to an example embodiment, the electronic device 200 may receive content DATA from the wireless interface 417 of the second wireless dongle 400-2 through the seventh path. According to an example embodiment, the wireless interface 417 may include at least one of Wireless HD (WiHD) module, Wireless Fidelity (Wi-Fi) module, Wireless gigabit (Wigig) module, and Bluetooth module. The wireless interface 417 may receive content from the content providing device 100 through the aforementioned module.

Hereafter, operations of the processor 140 of the content providing device 100, based on the connection relation between the content providing device 100, the electronic device 200, the wired cable 300, and the wireless dongle 400, will be described in detail in conjunction with FIGS. 3 to 5.

According to an example embodiment, the processor 140 may confirm a voltage level applied to the pull-down resistor 17 of the connector 111. According to an example embodiment, the processor 140 may determine whether the wired cable 300 or the first wireless dongle 400-1 is connected to the wired interface 110 based on a voltage level applied to the pull-down resistor 17. For example, the pull-up resistor 27 included in the wired cable 300 and the pull-up resistor 57 included in the first wireless dongle 400-1 may have different resistance values each other. Accordingly, the processor 140 may determine that the wired cable 300 is connected to the wired interface 110 if a first voltage level is applied to the pull-down resistor 17, and may determine that the first wireless dongle 400-1 is connected to the wired interface 110 if a second voltage level is applied thereto.

According to an example embodiment, the processor 140 may receive power from the electronic device 200 through the wired cable 300 if the wired cable 300 is connected to the wired interface 110. For example, the processor 140 may inactivate the power interface 120 (or at least one element included in the power interface 120) if the wired cable 300 is connected to the wired interface 110. According to an example embodiment, in the case that the power interface 120 is inactivated, the processor 140 may receive power from the external power source 70 through a power cable if the first wireless dongle 400-1 is connected to the wired interface 110. The processor 140 may activate the power interface 120 if the first wireless dongle 400-1 is connected to the wired interface 110.

According to an example embodiment, the wired cable 300 may include a wired cable 300 capable of supplying power and a wired cable 300 incapable of supplying power. For the wired cable 300 incapable of supplying power, for example, the first connector 311 and the second connector 313 may not include the fourth pins 24. The wired cable 300 capable of supplying power and the wired cable 300 incapable of supplying power are different each other in a resistance value of the pull-up resistor 27 included in the first connector 311. According to an example embodiment, the processor 140 may determine whether the wired cable 300 connected to the wired interface 110 is the wired cable 300 capable of supplying power or the wired cable 300 incapable of supplying power based on a voltage level applied to the pull-down resistor 17. For example, the processor 140 may determine that the wired cable 300 capable of supplying power is connected to the wired interface 110 if a first voltage level is applied to the pull-down resistor 17, and may determine that the wired cable 300 incapable of supplying power is connected to the wired interface 110 if a third voltage level is applied thereto.

According to an example embodiment, the processor 140 may receive power from the electronic device 200 through the wired cable 300 if a wired cable capable of supplying power is connected to the wired interface 110. According an example embodiment, the processor 140 may receive power from the external power source 70 through a power cable if a wired cable incapable of supplying power or the first wireless dongle 400-1 is connected to the wired interface 110.

Figure 6:
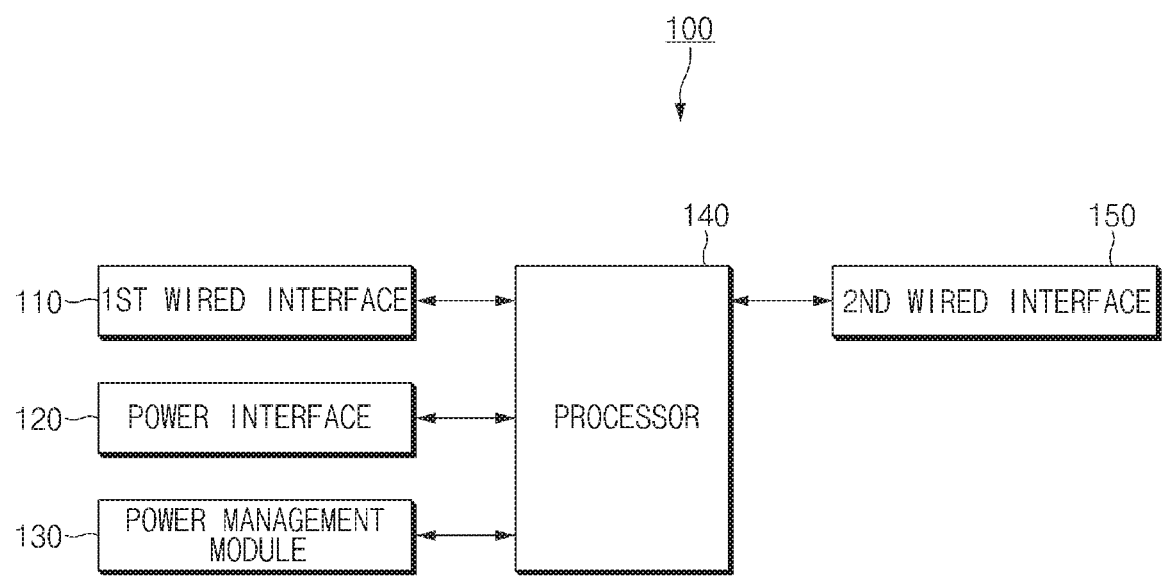
FIG. 6 is a block diagram illustrating a configuration of a content providing device according to an example embodiment.

FIG. 6 is a block diagram illustrating a configuration of a content providing device according to various example embodiments.

Referring to FIG. 6, the content providing device 100 according to an example embodiment may further include a second wired interface 150 in addition to the wired interface (or a first wired interface) 110, the power interface 120, the power management module 130, and the processor 140.

According to an example embodiment, the second wired interface 150 may receive content from an external source device. According to an example embodiment, the second wired interface 150 may include at least one of High Definition Multimedia Interface (HDMI) interface, Digital Video Interactive (DVI) interface, and Universal Serial Bus (USB) interface.

Figure 7A:
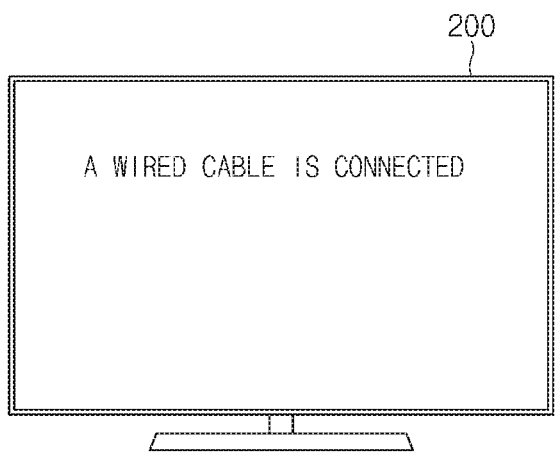
FIGS. 7A and 7B illustrate user interfaces displayed in another electronic device according to an example embodiment.
Figure 7B:
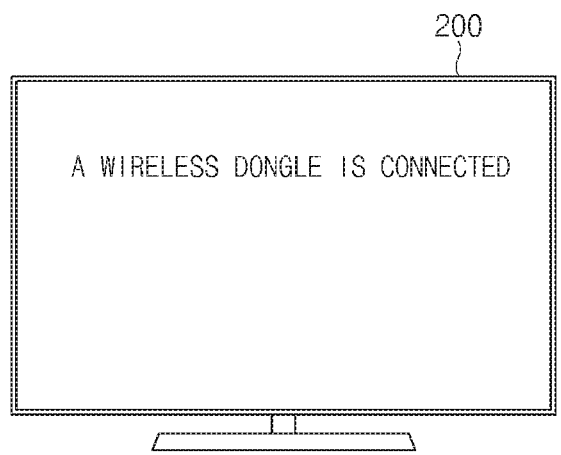

FIGS. 7A and 7B illustrate user interfaces displayed in other electronic devices according to various example embodiments.

According to an example embodiment, the electronic device 200 may determine whether the wired cable 300 or the second wireless dongle 400-2 is connected to the wired interface 210.

According to an example embodiment, the electronic device 200 may verify a voltage level applied to the pull-up resistor 47 of the connector 211. According to an example embodiment, the electronic device 200 may determine whether the wired cable 300 or the second wireless dongle 400-2 is connected to the wired interface 210 based on a voltage level applied to the pull-up resistor 47 included in a connector. For example, a pull-down resistor 37 included in the wired cable 300 and the pull-down resistor 67 included in the second wireless dongle 400-2 may have different resistance values each other. Accordingly, the electronic device 200 may determine that the wired cable 300 is connected to the wired interface 210 if a first voltage level is applied to the pull-up resistor 47, and may determine that the second wireless dongle 400-2 is connected to the wired interface 210 if a second voltage level is applied thereto.

According to an example embodiment, the electronic device 200 may determine whether the wired cable 300 or the second wireless dongle 400-2 is connected to the wired interface 210 based on connection information received from the content providing device 100. For example, the content providing device 100 may transmit information, which is about whether the wired cable 300 is connected to the content providing device or a first wireless dongle 400-1 is connected to the content providing device, through a fifth pin of the connector 111. The fifth pin of the connector 111, for example, may be a pin for Universal Asynchronous Receiver/Transmitter (UART) communication.

According to an example embodiment, if the electronic device 200 is connected with the content providing device 100 through the wired cable 300, the electronic device 200 may display a User Interface (UI), which is relevant to connection of the wired cable 300, on a display. For example, referring to FIG. 7A, the electronic device 200 may display a UI, such as displaying "A wired cable is connected", on the display. As another example, the electronic device 200 may display a guide UI relevant to a function that is usable when the wired cable 300 is connected to the display. According to an example embodiment, if the electronic device 200 is connected to the content providing device 100 through the second wireless dongle 400-2, the electronic device 200 may display a User Interface (UI), which is relevant to connection of the second wireless dongle 400-2, on a display. For example, referring to FIG. 7B, the electronic device 200 may display a UI, such as "A wireless dongle is connected", on the display. As another example, the electronic device 200 may display a guide UI relevant to a function that is usable when the second wireless dongle 400-2 is connected to the display.

Figure 8:
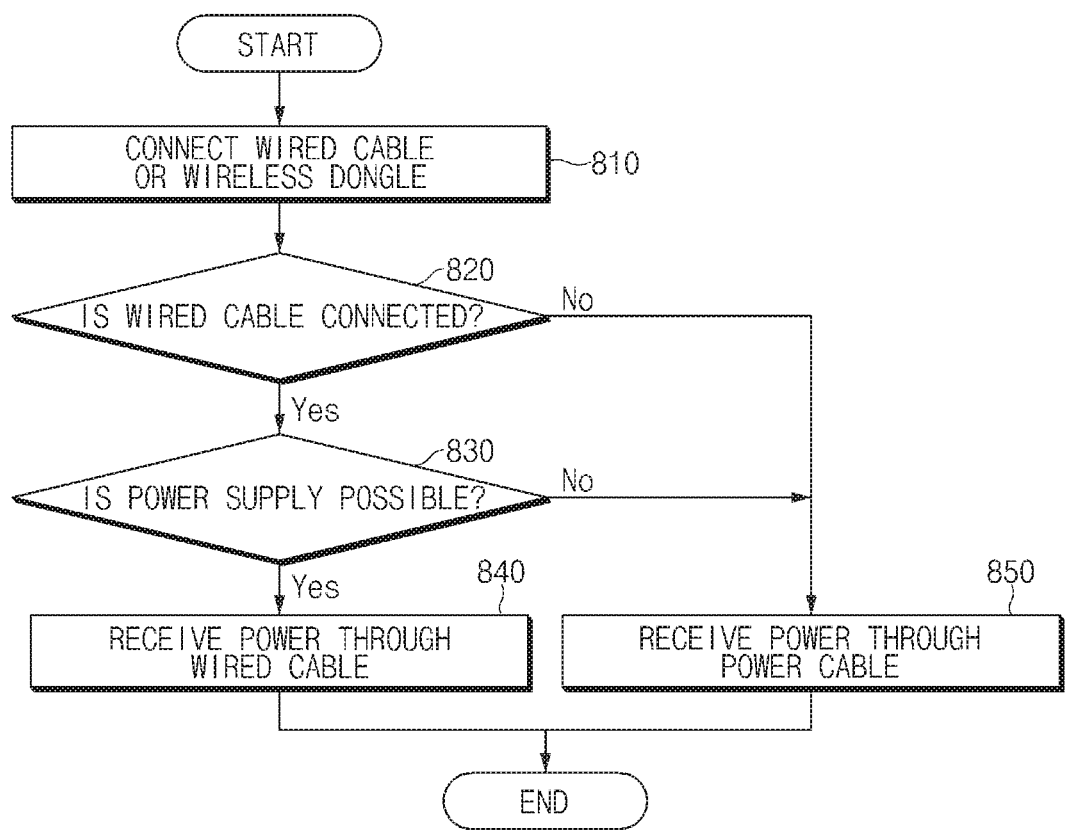
FIG. 8 is a flow chart showing a power source controlling method of a content providing device according to an example embodiment.

FIG. 8 is a flow chart showing a power source controlling method of a content providing device according to various example embodiments.

The flowchart shown in FIG. 8 may include operations which the content providing device 100 processes. Accordingly, although some description is omitted hereafter, the descriptions about the content providing device 100 in conjunction with FIGS. 1 to 7B may be applicable to the flowchart of FIG. 8.

According to an example embodiment, in operation 810, the content providing device 100 may be connected with a wired cable or a wireless dongle (e.g., the first wireless dongle 400-1) through a wired interface. According to an example embodiment, a wired interface may include one connector connectable to a wired cable or a wireless dongle. The content providing device 100 may transmit content to the electronic device 200 through a wired cable or a wireless dongle. According to an example embodiment, a wired interface may be a Serializer/Deserializer (SerDes) interface.

According to an example embodiment, in operation 820, the content providing device 100 may determine whether a wired interface is connected with a wired cable. According to an example embodiment, the content providing device 100 may determine whether the wired cable 300 or the wireless dongle is connected to a wired interface based on a voltage level applied to a pull-down resistor included in a connector. For example, the content providing device 100 may determine that the wired cable 300 is connected to a wired cable if a first voltage level is applied to a pull-down resistor, and may determine that a wireless dongle is connected to the wired interface if a second voltage level is applied thereto.

According to an example embodiment, unless a wired cable is connected to a wired interface (or the wireless dongle is connected), in operation 850, the content providing device 100 may receive power from an external power source through a power cable connected with a power interface. For example, the content providing device 100 may activate a power interface and receive power from an external power source through a power cable.

According to an example embodiment, if a wired cable is connected to a wired interface, in operation 830, the content providing device 100 may determine whether the wired cable is a wired cable capable of supplying power. According to an example embodiment, the content providing device 100 may determine whether a wired cable connected to a wired interface is the wired cable 300 capable of supplying power or the wired cable 300 incapable of supplying power based on a voltage level applied to a pull-down resistor. For example, the content providing device 100 may determine that a wired cable capable of supplying power is connected to a wired interface if a first voltage level is applied to a pull-down resistor, and may determine that a wired cable incapable of supplying power is connected to the wired interface if a third voltage level is applied thereto.

According to an example embodiment, if a wired cable capable of supplying power is connected to a wired interface, in operation 840, the content providing device 100 may receive power from the electronic device 200 through the wired cable. For example, the content providing device 100 may inactivate a power interface and receive power from the electronic device 200 through a wired cable.

According to an example embodiment, if a wired cable incapable of supplying power to a wired interface is connected to the wired interface, in operation 850, the content providing device 100 may receive power from an external power source through a power cable connected to a power interface. For example, the content providing device 100 may activate a power interface and receive power from an external power source through a power cable.

The term "module" used in this disclosure may include implemented with hardware, software or firmware. For example, the term "module" may be interchangeably used with the terms "logic", "logical block", "component" and "circuit". The "module" may be an integrated component or may be a minimum unit for performing one or more functions or a part thereof. A "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various example embodiments may be, for example, implemented by instructions stored in computer-readable storage media in the form of a program module. The instruction, when executed by a processor, may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, an instruction may include not only a code generated by a compiler but also a code executable using an interpreter. A module or a program module according to various example embodiments may include at least one of the above elements, or a part of the above elements may be omitted, or additional other elements may be further included.

Operations performed by a module, a program module, or other elements according to various example embodiments may be executed sequentially, in parallel, repeatedly, or in a heuristic method. In addition, some operations may be executed in different sequences or may be omitted. Alternatively, other operations may be added.

According to various example embodiments, a content providing device may verify whether a wired cable or a wireless dongle is connected to a wired interface. Accordingly, it is possible to effectively control power of the content providing device.

While example embodiments have been shown and described, it will be understood by those skilled in the art that various changes in form and details may be made to the example embodiments.

What is claimed is:

1. A content providing device comprising:
a power interface configured to receive power from an external power source through a power cable;
a first wired interface configured to communicate with a first external electronic device selectively through a wired cable or a wireless dongle; and
a processor configured to:
in response to determining that the wired cable is connected to the first wired interface and the wireless dongle is not connected to the first wired interface, receive the power from the first external electronic device through the wired cable; and
in response to determining that the wireless dongle is connected to the first wired interface and the wired cable is not connected to the first wired interface, receive the power from the external power source through the power cable, wherein
the first wired interface comprises a connector,
the connector comprises a pull-down resistor, and
the processor is further configured to:
in response to determining that the wired cable or the wireless dongle is connected to the connector, determine a voltage level applied to the pull-down resistor, and
determine, based on the voltage level applied to the pull-down resistor, whether the wired cable or the wireless dongle is connected to the first wired interface.

2. The content providing device of claim 1, wherein the processor is further configured to:
in response to determining that the wired cable is connected to the first wired interface, inactivate the power interface, and
in response to determining that the wireless dongle is connected to the first wired interface, activate the power interface.

3. The content providing device of claim 1, wherein the processor is further configured to determine whether the wired cable is capable of supplying power or is incapable of supplying power based on the voltage level applied to the pull-down resistor.

4. The content providing device of claim 3, further comprising:
wherein the processor is further configured to:
in response to determining that the wired cable is capable of supplying power to the first wired interface, receive the power from the first external electronic device through the wired cable; and
in response to determining that the wireless dongle or the wired cable is incapable of supplying power to the first wired interface, receive the power from the external power source through the power cable.

5. The content providing device of claim 1, wherein the first wired interface comprises a Serializer/Deserializer (SerDes) interface.

6. The content providing device of claim 1, further comprising:
a second wired interface configured to communicate with a second external electronic device,
wherein the second wired interface comprises at least one from among a High Definition Multimedia Interface (HDMI), a Digital Video Interface (DVI), a Universal Serial Bus (USB) interface, and a Radio Frequency (RF) interface.

7. A power source controlling method of a content providing device, the method comprising:
in response to determining that a wired cable is connected to a wired interface and a wireless dongle is not connected to the wired interface, receiving power from an external electronic device through the wired cable; and
in response to determining that the wireless dongle is connected to the wired interface and the wired cable is not connected to the wired interface, receive the power from an external power source through a power cable, wherein
the wired interface comprises a connector,
the connector comprises a pull-down resistor, and
the method further comprises:

in response to determining that the wired cable or the wireless dongle is connected to the connector, determining a voltage level applied to the pull-down resistor, and determining, based on the voltage level applied to the pull-down resistor, whether the wired cable or the wireless dongle is connected to the wired interface.

8. The method of claim 7, wherein the receiving of the power from the external electronic device comprises inactivating a power interface, and wherein the receiving of the power from the external power source comprises activating the power interface.

9. The method of claim 7, further comprising determining whether the wired cable is capable of supplying power or is incapable of supplying power based on the voltage level applied to the pull-down resistor.

10. The method of claim 9, further comprising:

in response to determining that the wired cable is capable of supplying power to the wired interface, receiving power from the external electronic device through the wired cable; and in response to determining that the wireless dongle or the wired cable is incapable of supplying power to the wired interface, receiving power from the external power source through the power cable connected with a power interface.

11. The method of claim 7, wherein the wired interface comprises a Serializer/Deserializer (SerDes) interface.

12. A non-transitory computer-readable recording medium having embodied thereon a program, which when executed by a processor causes the processor to execute a method, the method comprising:

in response to determining that a wired cable is connected to a wired interface and a wireless dongle is not connected to the wired interface, receiving power from a first external electronic device through the wired cable; and in response to determining that the wireless dongle is connected to the wired interface and the wired cable is not connected to the wired interface, receive the power from an external power source through a power cable, wherein the wired interface comprises a connector, the connector comprises a pull-down resistor, and the method further comprises:

in response to determining that the wired cable or the wireless dongle is connected to the connector, determining a voltage level applied to the pull-down resistor, and determining, based on the voltage level applied to the pull-down resistor, whether the wired cable or the wireless dongle is connected to the wired interface.

* * * * *